United States Patent [19]

Oetjen

[11] 4,405,185
[45] Sep. 20, 1983

[54] ROLLER BEARING

[75] Inventor: Jürgen Oetjen, Herzogenaurach, Fed. Rep. of Germany

[73] Assignee: INA Walzlager Schaeffler KG, Herzogenaurach, Fed. Rep. of Germany

[21] Appl. No.: 332,843

[22] Filed: Dec. 21, 1981

[30] Foreign Application Priority Data

Dec. 20, 1980 [DE] Fed. Rep. of Germany ....... 3048228

[51] Int. Cl.³ ............................................. F16C 29/06
[52] U.S. Cl. .................................................. 308/6 C
[58] Field of Search ................ 308/6 C, 6 R, 4 R, 3.8

[56] References Cited

U.S. PATENT DOCUMENTS 3,111,350 11/1963 Anderson ................................. 308/6
4,352,526 10/1982 Imai ..................................... 308/6 C

FOREIGN PATENT DOCUMENTS 1193830 11/1959 France .

*Primary Examiner*—Lenard A. Footland
*Attorney, Agent, or Firm*—Hammond & Littell, Weissenberger and Muserlian

[57] ABSTRACT

A roller bearing for the longitudinally moveable mounting of an element with a straight race comprising a bearing body having two race sections of which at least one is straight, the two race sections being connected at their ends to each other by a curved race section at each end to form a closed race for cylindrical rolling elements being secured by retaining means against falling out, the race being laterally bounded by separate flange plates secured to the bearing body, the flange plates being thin-walled elements having in at least part of the race area chiplessly formed on rims being formed in such a way that the material in the area of the rims is offset by a partial amount of the thickness of the flange plates parallel to the latter and towards the race.

5 Claims, 7 Drawing Figures

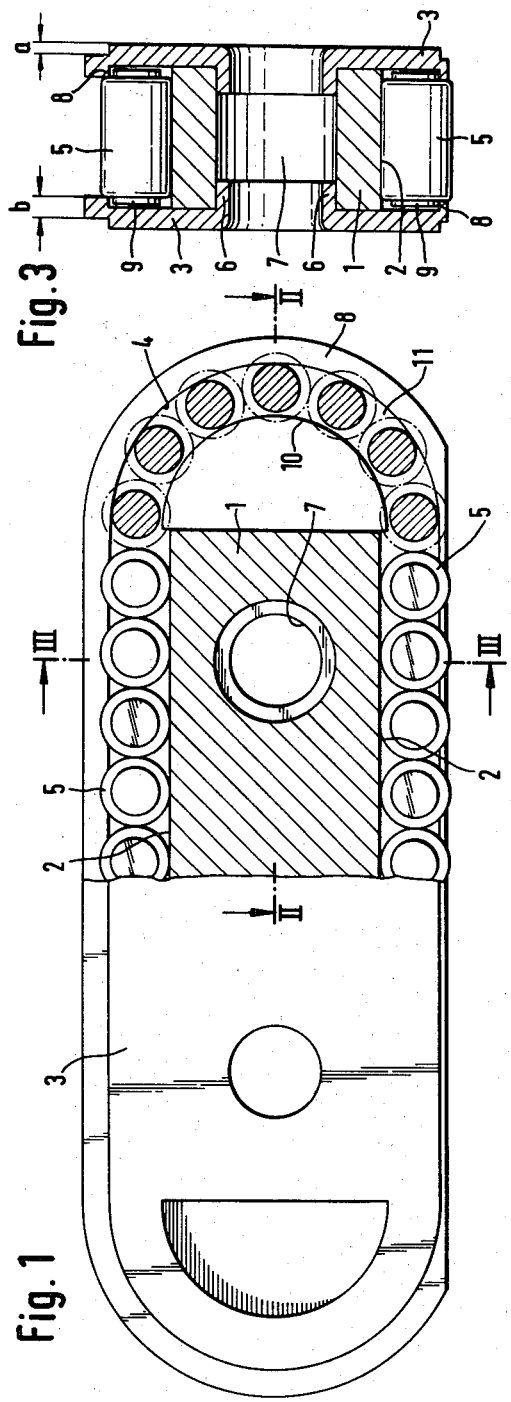
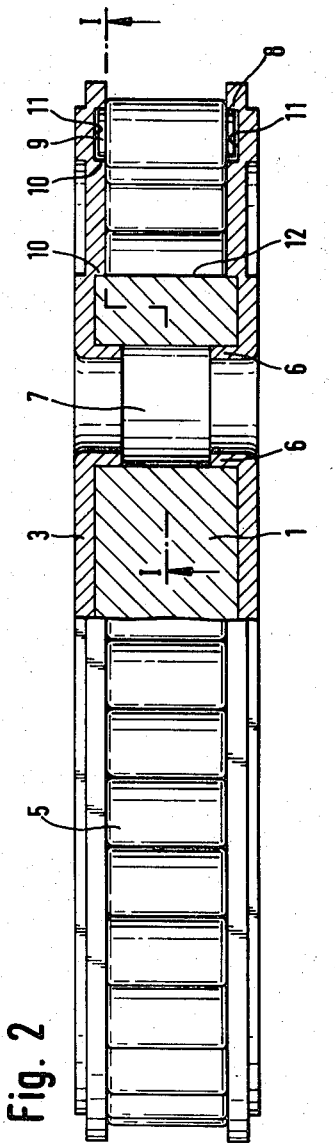

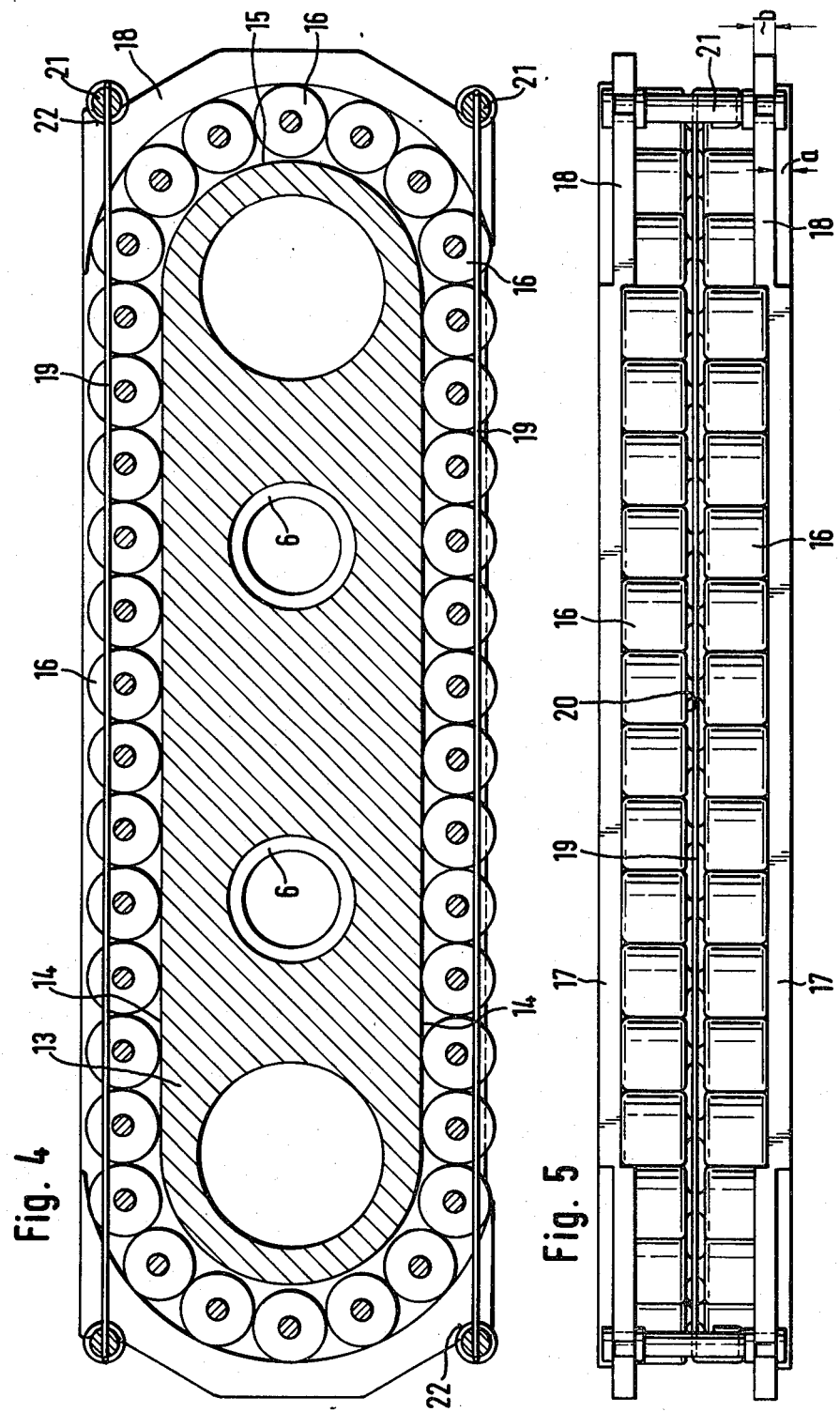

ROLLER BEARING

STATE OF THE ART

Roller bearings for the longitudinally moveable mounting of an element with a straight race comprised of a bearing body having two race sections, at least one of which is straight, the race sections being connected by two curved guide sections to form a circulating race for cylindrical rollers which is closed in itself, the rollers being secured against falling out by holding means and the race being bounded laterally by flange plates joined to the bearing body are known. U.S. Pat. No. 3,111,350 describes a roller bearing of this type wherein the circulating race is bounded by solid flange plates which perform no holding function and guide the rollers axis-parallel only. A link chain is additionally provided for the retention of the rollers. Especially in long roller bearings of this type, this entails the danger of the roller sagging in the lower race area which can lead to difficulties in assembly.

In another known roller bearing of this kind described in French Pat. No. 1,193,830, separate flange plates are provided to bound the circulating race laterally, not only guiding the rollers but also preventing them from falling out. But this requires a continuous groove to be machined into the flange plates by chip removal which groove can engage the reduced faces of the rollers. Such an embodiment requires additional labor costs due to the machining of the flange plates cancelling out, at least in part, the advantages of the separate flange plates.

OBJECTS OF THE INVENTION

It is an object of the invention to avoid the disadvantages of the prior art and provide separate flange plates for such roller bearings whereby machining by chip removal is not necessary while retention of the rollers is assured, at least in part of areas of the race, and roller sagging is prevented.

This and other objects and advantages of the invention will become obvious from the following detailed description.

THE INVENTION

The novel roller bearing for the longitudinally moveable mounting of an element with a straight race is comprised of a bearing body having two race sections of which at least one is straight, the two race sections being connected at their ends to each other by a curved race section at each end to form a closed race for cylindrical rolling elements being secured by retaining means against falling out, the race being laterally bounded by separate flange plates secured to the bearing body, the flange plates being thin-walled elements having in at least part of the race area chiplessly formed on rims being formed in such a way that the material in the area of the rims is offset by a partial amount of the thickness of the flange plates parallel to the latter and towards the race. The thin-walled plates are preferably made of sheet metal and the offset area is preferably formed by stamping the flange plate thickness towards the race parallel to the flange plates.

This construction has the advantage that the flange plates may be made out of sheet metal elements without chip removal while directly or indirectly assuring both guidance and retention of the roller bodies. In the invention, the retention rims are formed on in an appropriately designed die which prevents the material from being cut through in an operation corresponding to stamping, such rims being no longer producible by bending because of the required thickness of the flange plates. This design simplifies, and thereby reduces considerably the production costs of such roller bearings.

It is provided in another embodiment of the invention that the rims extend over the entire roller race which makes it possible in a particularly simple manner to guide and retain rollers having ends of reduced diameter over the entire race without additional means. The roller bearing can therefore be made with a full complement of rollers, thereby increasing its load carrying capacity.

In a modification of the invention, it is also possible to dispose the rims only in the area of the curved guide sections which arrangement is particularly expedient when cylindrical rollers with a peripheral groove are used which are secured in the area of the straight race sections such as by a retaining wire engaging the peripheral groove. In the arms of the curved guide sections, the rollers are then gripped by the rims on their sides facing away from the bearing body without having to provide separate head parts.

The design may be such for particular advantage that there are provided in the area of the first mentioned rims other rims which form a groove with the outer rims and grip under the roller retention means on the side facing the bearing body. This obviates the curved guide section on the bearing body so that the bearing body itself is formed only by a rectangular component because the retention of the rollers is assumed by the groove on the side facing the bearing body also.

Finally, it is also possible to provide the rims at least in the area of one straight race section which design is advantagous for long roller bearings of this type if the rollers are guided and retained in link cages over the entire race because sagging of the rollers which can lead to assembly problems is then prevented in the straight race section.

Referring now to the drawings:

FIG. 1 is a partial longitudinal view of one embodiment of the bearing of the invention taken along the line I—I of FIG. 2 while FIGS. 2 and 3 are cross-sectional view of the same embodiment taken along lines II—II and III—III, respectively of FIG. 1.

FIG. 4 is a longitudinal sectional view of another embodiment of a bearing of the invention and FIG. 5 is a plan view of the same embodiment.

Figure 6:
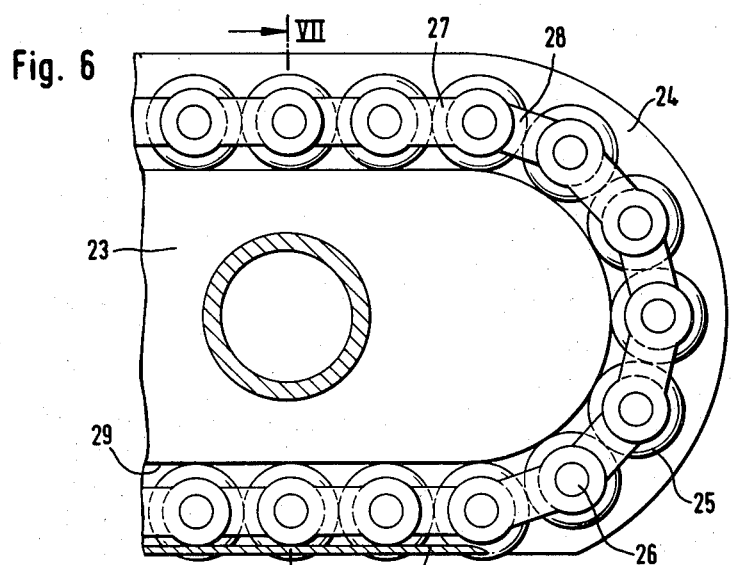
FIG. 6 is another bearing embodiment which is a partial cross-sectional view taken along line VI—VI of FIG. 7

The roller bearing of FIGS. 1 to 3 consists of bearing body 1 forming two straight race section 2 and being bounded laterally by separate sheet metal flange plates 3 whose curved guide sections 4 form, in conjunction with straight race sections 2, a self-enclosed race for cylindrical rollers 5. The flange plates 3 have section 6 for fastening to the bearing body 1, drawn in the manner of hollow rivets which are in flush engagement with cross-holes 7 of bearing body 1.

Flange plates 3 are provided at their outer peripheral surface with chiplessly formed-on rims 8 brought about in that the material is offset in the area of the rims 8 by a partial amount (a) of the thickness (b) of the flange plates 3 parallel to the latter and towards the race 2. The rims 8 extend over the entire race, gripping over the reduced ends 9 of the rollers 5 on their side facing away from the bearing body for their retention. In addition to the outer rims 8, there are provided in the curved guide sections 4 of the flange plates 3, additional chiplessly formed-on rims 10 which form a groove 11 together with the outer rims 8. In the area of the groove 11, the ends 9 of the rollers 5 are engaged also on the side facing the bearing body so that separate guide sections on bearing body 1 are necessary. FIG. 2 shows in particular, that the rims 10 grip flush behind the plane faces 12 of the bearing body 1, thereby additionally improving the fastening of the flange plates 3 to the bearing body 1.

The roller bearing of FIGS. 4 and 5 consists of bearing body 13 which has two straight race sections 14 and two curved guide sections 15 forming a self-enclosed roller race for rollers 16. The race is bounded laterally by separate flange plates 17 which, as shown in FIG. 3, are joined flush to bearing body 13. For the retention of the rollers 16, there are provided on the flange plates 17, in the area of the curved guide sections 15 only, chiplessly formed-on rims 18 which engage rollers 16 flush on their faces facing away from the bearing body 13. In the straight race sections 14, rollers 16 are retained by round wires 19 engaging a peripheral groove 20 of rollers 16 and the round wires 19 themselves are fastened to bolts 21 which snap into recesses 22 in the faces of flange plates 17.

Figure 7:
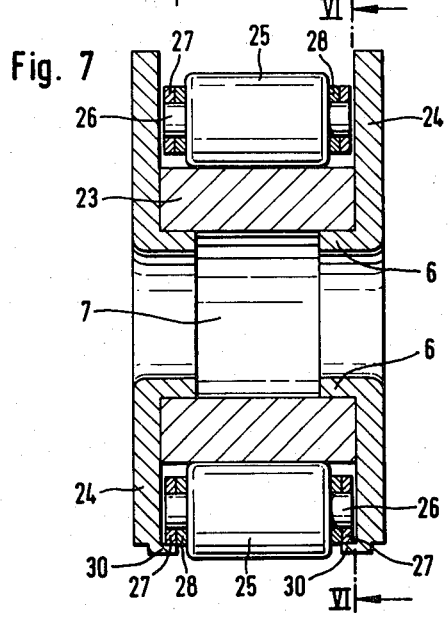
FIG. 7 is a tranverse sectional view of the same embodiment taken along line VII—VII of FIG. 6.

In the embodiment of FIGS. 6 and 7, the self-enclosed race is formed by a bearing body 23 which is likewise provided with separate flange plates 24. Here, the rollers 25 have at their end pins 26 over which claim links 27 and 28 are pushed for retention purposes and the rollers 25 are guided axis-parallel along the flange plates 24 chain links 27 and retained additionally in the lower, straight race section 29 by a chiplessly formed-on rim 30 to prevent sagging of rollers 25.

Various modifications of the bearings of the invention may be made without departing from the spirit or scope thereof and it is to be understood that the invention is intended to be limited only as defined in the appended claims.

What I claim is:

1. A roller bearing for the longitudinally moveable mounting of an element with a straight race comprising a bearing body having two race sections of which at least one is straight, the two race sections being connected at their ends to each other by a curved race section at each end to form a closed race for cylindrical rolling element being secured by retaining means against falling out, the race being laterally bounded by separate flange plates secured to the bearing body, the flange plates being thin-walled elements having, in at least part of the race area, chiplessly formed on rims, being formed in such a way that the material in the area of the rims is offset by a partial amount of the thickness of the flange plates parallel to the latter and towards the race.

2. A roller bearing of claim 1 wherein the rims extend over the entire roller race.

3. A roller bearing of claim 1 wherein the rims are disposed only in the area of the curved race section for guidance.

4. A roller bearing of claims 1, 2 or 3 wherein additional rims are provided in the area of the curved race sections within the first rims which rims cooperate to form a groove and grip under the retaining means of the rollers on the side facing the bearing body.

5. A roller bearing of claim 1 wherein rims are provided at least in the area of one plane race section.

* * * * *